United States Patent
Swanson et al.

[11] Patent Number: 6,102,463
[45] Date of Patent: Aug. 15, 2000

[54] VEHICLE SEAT ASSEMBLY WITH HIDDEN STORAGE COMPARTMENT

[75] Inventors: Mark H. Swanson, Redford; Thomas Richard Van Slembrouck, Sterling Heights; Jun Such D. Heur, Rochester Hills; Robert P. Johnson, Ortonville; Ronald Joseph Smith, Sterling Heights, all of Mich.

[73] Assignee: Delphi Technologies, Inc., Troy, Mich.

[21] Appl. No.: 09/313,790

[22] Filed: May 18, 1999

[51] Int. Cl.⁷ ........................................................ B60N 3/12
[52] U.S. Cl. .................................... 296/37.15; 296/65.01; 296/65.05; 296/65.09; 296/69; 297/188.1; 297/188.01; 297/188.9
[58] Field of Search ................................ 296/65.01, 68.1, 296/69, 65.05, 65.09, 66, 37.1, 37.15, 37.8; 297/335, 188.01, 188.1, 188.09, 411.21

[56] References Cited

U.S. PATENT DOCUMENTS

| | | | |
|---|---|---|---|
| 492,049 | 2/1893 | Piper | 296/37.15 |
| 2,958,499 | 11/1960 | Sterner . | |
| 3,026,141 | 3/1962 | Welles . | |
| 3,428,357 | 2/1969 | Lueck . | |
| 3,594,039 | 7/1971 | Harp | 297/252 |
| 3,625,347 | 12/1971 | Trammell, Jr. . | |
| 4,878,706 | 11/1989 | Novikov . | |
| 5,039,155 | 8/1991 | Suman | 296/65.1 |
| 5,658,046 | 8/1997 | Rus | 297/378.1 |
| 5,702,145 | 12/1997 | Fowler | 296/66 |
| 5,816,650 | 10/1998 | Lucas, Jr. | 297/188.1 |
| 5,902,009 | 5/1999 | Singh et al. | 297/188.1 |
| 5,951,084 | 9/1999 | Okazaki et al. | 296/37.16 |
| 6,027,164 | 2/2000 | Jukubiec et al. | 297/188.01 |

FOREIGN PATENT DOCUMENTS

| | | | |
|---|---|---|---|
| 438858 | 1/1990 | European Pat. Off. | 296/37.15 |
| 352582 | 1/1990 | Switzerland . | |

*Primary Examiner*—D. Glenn Dayoan
*Assistant Examiner*—Mickki Murray
*Attorney, Agent, or Firm*—Kathryn A. Marra

[57] ABSTRACT

A vehicle seat assembly has a hidden storage compartment disposed in a seat member of the seat assembly. The seat member is pivotally connected to a support mounted on a vehicle floor and is pivotable between forward and rear positions. The seat member has a seating side which faces upward in the rear position and an oppositely facing storage side which faces upward in the forward position. The storage side includes a recess in the seat member internally defining a storage compartment and has an openable cover normally closing the storage compartment and openable to allow access thereto. The cover forms a storage floor surface when the seat member is in the forward position. The assembly has a releasable latch for retaining the cover in a closed position and preventing spilling of the contents therefrom when the seat member is inverted in the rear position. When the seating member is in the rear position, the storage compartment is hidden from view.

6 Claims, 2 Drawing Sheets

VEHICLE SEAT ASSEMBLY WITH HIDDEN STORAGE COMPARTMENT

TECHNICAL FIELD

This invention relates to vehicle seat assemblies and, more particularly, to a vehicle seat assembly having a hidden storage compartment disposed in a seat member of the assembly.

BACKGROUND OF THE INVENTION

It is known in the art relating to accessories for automobiles to provide storage compartments within the vehicle. In the past, storage compartments have been located in various different areas of an automotive vehicle. One location is the glove box in the instrument panel area of the vehicle. Other locations have included armrests with storage compartments, side pockets of doors and overhead consoles. Some vehicles include floor consoles located between the seats of a vehicle which also include storage areas for miscellaneous items. These compartments take up valuable space such as headroom, floor height and wheel well space. Also, some of these compartments may "advertise" that something is hidden from view, thus drawing attention to hidden items and inviting theft. There is a need to provide a large storage area in a vehicle that does not draw attention to itself and invite theft.

SUMMARY OF THE INVENTION

The present invention is directed to a vehicle seat assembly having a hidden storage compartment disposed in a seat member of the seat assembly. The assembly includes a seat member pivotally connected to a support which is mounted on a vehicle floor. The seat member is pivotable between forward and rear positions. The seat member has a seating side which faces upward in the rear position and an oppositely facing storage side which faces upward in the forward position. The storage side includes a recess in the seat member internally defining a storage compartment and has an openable cover normally closing the storage compartment and openable to allow access thereto. The cover forms a storage floor surface when the seat member is in the forward position. The assembly has a releasable latch for retaining the cover in a closed position so that the storage compartment is covered in the forward position of the seat and the contents are prevented from spilling when the seat member is inverted in the rear position. The storage compartment may have a locking mechanism to prevent unauthorized access to the storage area.

The seat assembly may include a seat back abutting a rear end of the seat member such that the seat member can be rotated forward without moving the seat back. The seat back is pivotable between forward and rear positions. When the seat back and seat member are rotated toward the front of the vehicle into their forward positions, the seat back and the storage side of the seat member form additional floor surfaces.

By having a storage compartment disposed within the seat member, no additional vehicle space is required. It provides a much larger hidden area for storage than traditionally found in vehicles without trunks and a secure storage area without drawing attention to itself. It also may provide an opportunity to reduce the size of the glove box to better meet the packaging needs of air bag systems.

These and other features and advantages of the invention will be more fully understood from the following description of a certain specific embodiment of the invention taken together with the accompanying drawings.

DESCRIPTION OF THE PREFERRED EMBODIMENT

Figure 1:
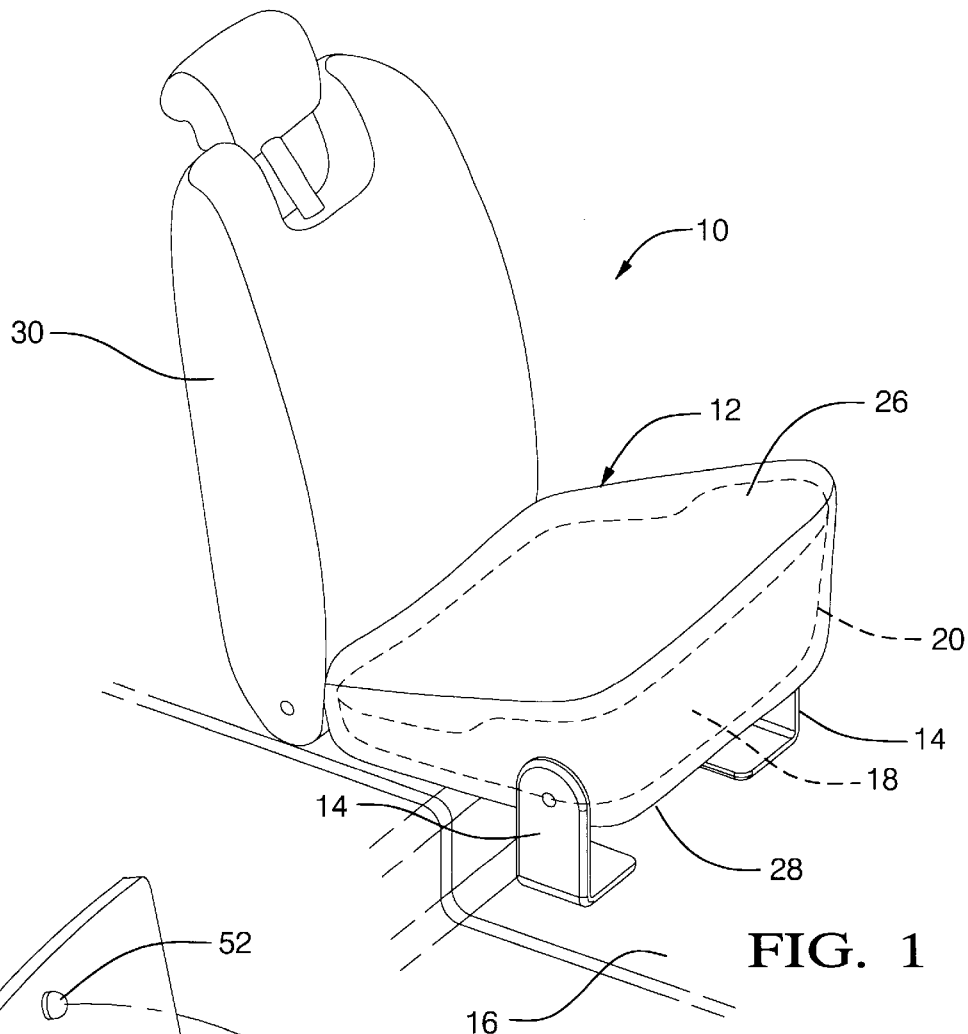
FIG. 1 is a perspective view of a vehicle rear seat assembly in accordance with the present invention.
Figure 2:
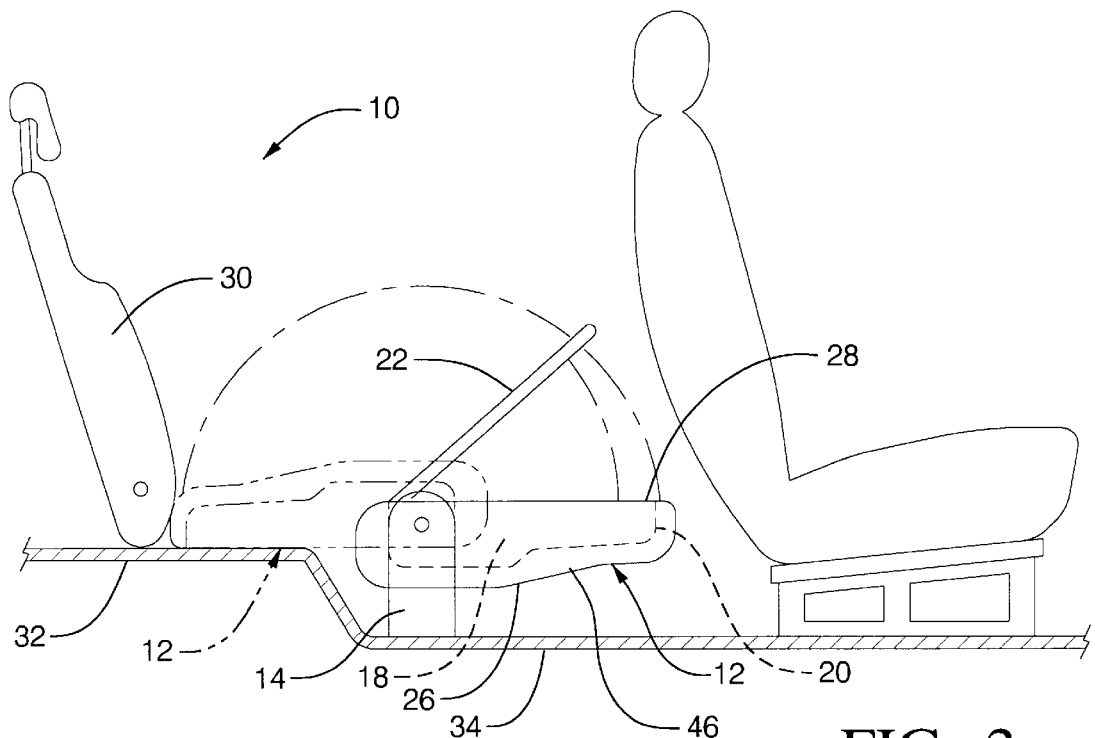
FIG. 2 is a side view of a vehicle rear seat assembly having a seat member in a forward position.

Referring now to FIG. 1 of the drawings, numeral 10 generally indicates a vehicle seat assembly. The assembly 10 includes a seat member 12 pivotally mounted on one or more supports 14 that are mounted on a vehicle floor 16. The seat member 12 has a recess 18 which internally defines a storage compartment 20 that provides hidden storage space. A cover 22, shown in FIG. 2, is movable between open and closed positions allowing and preventing access to storage compartment 20. Releasable latch 24 keeps the cover 22 in the closed position.

The seat member 12 is pivotable about the supports 14 between rear and forward positions. The seat member 12 has a seat side 26 and an oppositely facing storage side 28. When the seat assembly 10 is in an ordinary state of use, the seat member 12 is in the rear position and the seat side 26 is facing upward for carrying an occupant of the vehicle. When the seat member 12 is in the forward position, the storage side 28 is facing upward and the cover 22 is exposed.

Figure 3:
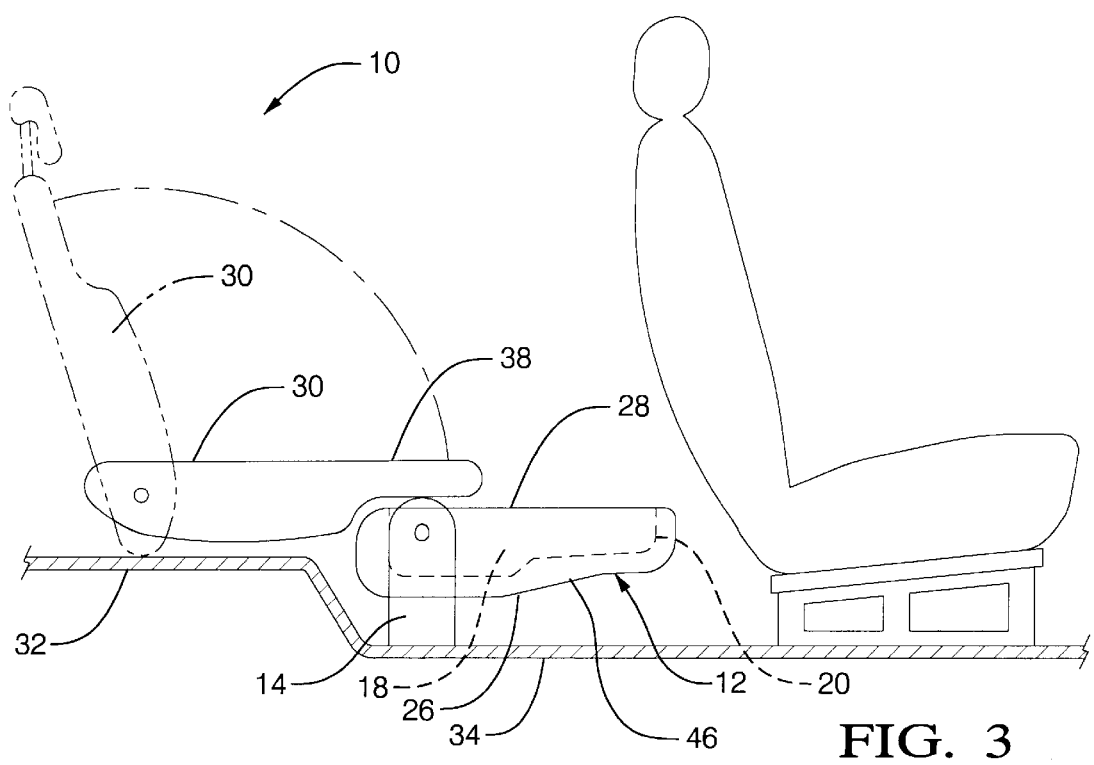
FIG. 3 is a side view of a vehicle rear seat assembly having a seat back and a seat member in forward positions.

In a specific embodiment the seat assembly 10 is for a rear seat assembly and includes a seat back 30 which is mounted to a higher portion 32 of a stepped floor of the vehicle and the seat member 12 is mounted to a lower portion 34 of the stepped floor as shown in FIGS. 2 and 3. The seat back 30 abuts a rear end of the seat member 12 such that the seat member 12 can be rotated forward without moving the seat back 30. The seat back 30 is pivotable between forward and rear positions. When the seat back 30 and the seat member 12 are rotated toward the front of the vehicle into forward positions as illustrated in FIG. 3, the seat back 30 and the storage side 28 of the seat member 12 form additional floor surfaces 28,38. Floor surfaces 28,38 provide additional storage space within the vehicle.

Figure 4:
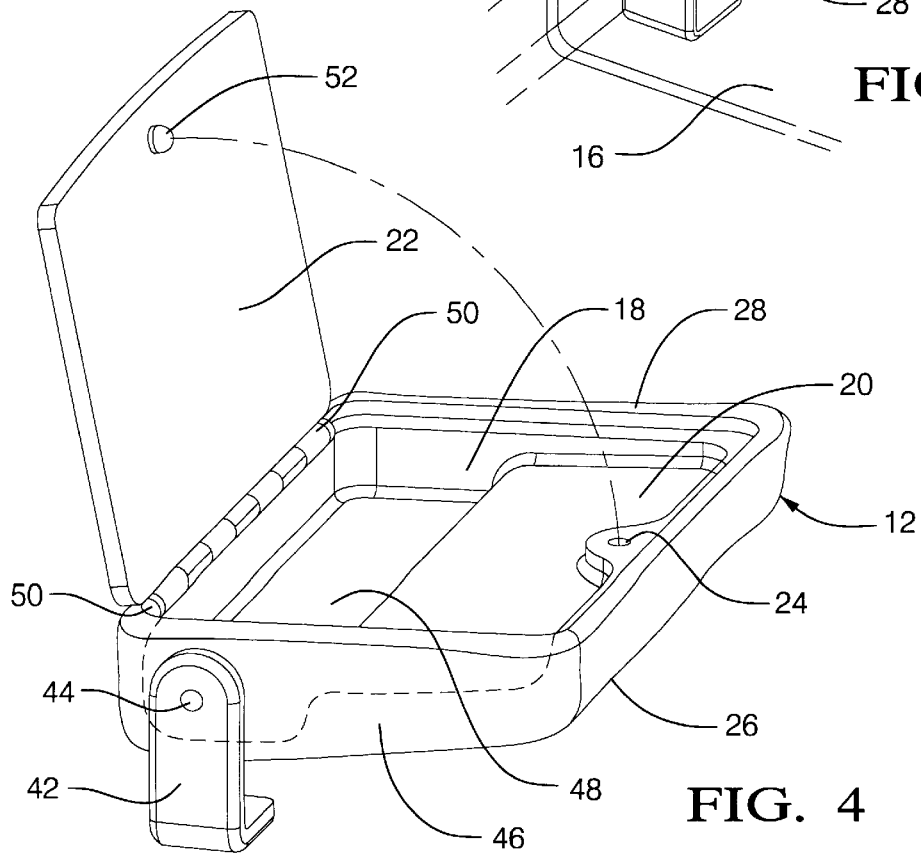
FIG. 4 is a perspective view of the seat member in a forward position and a cover of a storage compartment in the open position.

A front end portion of the seat member 12 is mounted to the vehicle floor surface 34 via the support 14. The support 14 may be formed by L-shaped bracket 42 and hinge elements 44 as shown in FIG. 4. One portion of the bracket 42 is mounted to a side of the seat member 12 via the hinge element 44 and another portion of the bracket 42 is mounted to the floor surface 34. The brackets and hinges 42,44 allow the seat member 12 to be rotated into the forward position as illustrated by the solid lines in FIG. 2 in which the seat member 12 has been rotated approximately 180 toward the front of the vehicle from the rear position shown in dashed lines.

To gain access to the storage compartment 20, the seat member 12 must be in the forward position as illustrated in FIG. 2. The storage compartment 20 is defined by the recess 18 in the seat member 12. The seat member 12 includes cushioning 46 on the seating side 26 adjacent the storage compartment 20 to assure the comfort of the occupant. The size of the storage compartment 20 is limited only by the size of the seat member 12 and the cushioning 46. The inside of the storage compartment 20 may be covered with a lining 48 to minimize the noise from movement of contents in the storage compartment 20.

When the seat member 12 is rotated forward, the cover 22 of the storage compartment 20 is exposed. The cover 22 may be attached to the storage side 28 of the seat member 12 by hinge elements 50. Alternatively, the cover 22 may be completely removable. Releasable latch 24 keeps the cover 22 from opening when the seat member 12 is in the rear position. The latch 24 may include a locking mechanism 52, such as a lock and key device, preventing the unauthorized lifting of the cover 22.

By limiting access to the storage compartment 20 to the storage side 28 of the seat member 12 which is visible only when the seat member 12 is in the forward position, the storage compartment 20 is hidden from view in the occupant seating position and thus does not draw attention to itself and invite theft. The storage compartment 20 does not require additional vehicle space. It provides a much larger hidden area for storage than traditionally found in vehicles without trunks.

While the invention has been described by reference to a certain preferred embodiment, it should be understood that numerous changes could be made within the spirit and scope of the inventive concepts described. Accordingly it is intended that the invention not be limited to the disclosed embodiment, but that it have the full scope permitted by the language of the following claims.

What is claimed is:

1. A vehicle seat assembly including a seat back and a bottom seat member, the assembly comprising:

a support mounted directly on a vehicle floor;

the seat member pivotally mounted on said support and pivotable between forward and rear positions, the seat member having a seating side and an oppositely facing storage side;

the seating side facing upward in the rear position for carrying an occupant of the vehicle and the storage side facing upward in the forward position;

the storage side including a recess in the seat member opening to the storage side and internally defining a storage compartment, and an openable cover normally closing the storage compartment and openable to allow access thereto, the cover forming a storage floor surface when the seat member is in the forward position; and releasable latch means for returning the cover in a closed position for covering the storage compartment in the forward position and for preventing spilling of the contents therefrom when the seat member is inverted in the rear position and the storage compartment is thereby hidden from view.

2. An assembly as in claim 1 wherein the storage compartment has a locking mechanism to prevent unauthorized lifting of the cover.

3. An assembly as in claim 1 wherein the seat member includes cushioning on the seating side adjacent the storage compartment to assure the comfort of the occupant.

4. An assembly as in claim 1 wherein the seat assembly includes a seat back that is rotatable toward the front of the vehicle into a forward position, when the seat member is in the forward position, the seat back forming an additional storage floor surface when in the forward position.

5. An assembly as in claim 1 wherein the seat assembly includes a seat back that abuts one end of the seat member such that the seat member can be rotated without moving the seat back.

6. An assembly as in claim 1 wherein the storage compartment includes a lining to minimize noise from movement of contents in the storage compartment.

* * * * *